Oct. 13, 1931.  C. W. VOGT  1,827,629
REFRIGERATING APPARATUS FOR PACKAGE GOODS
Filed Sept. 13, 1930  2 Sheets-Sheet 1
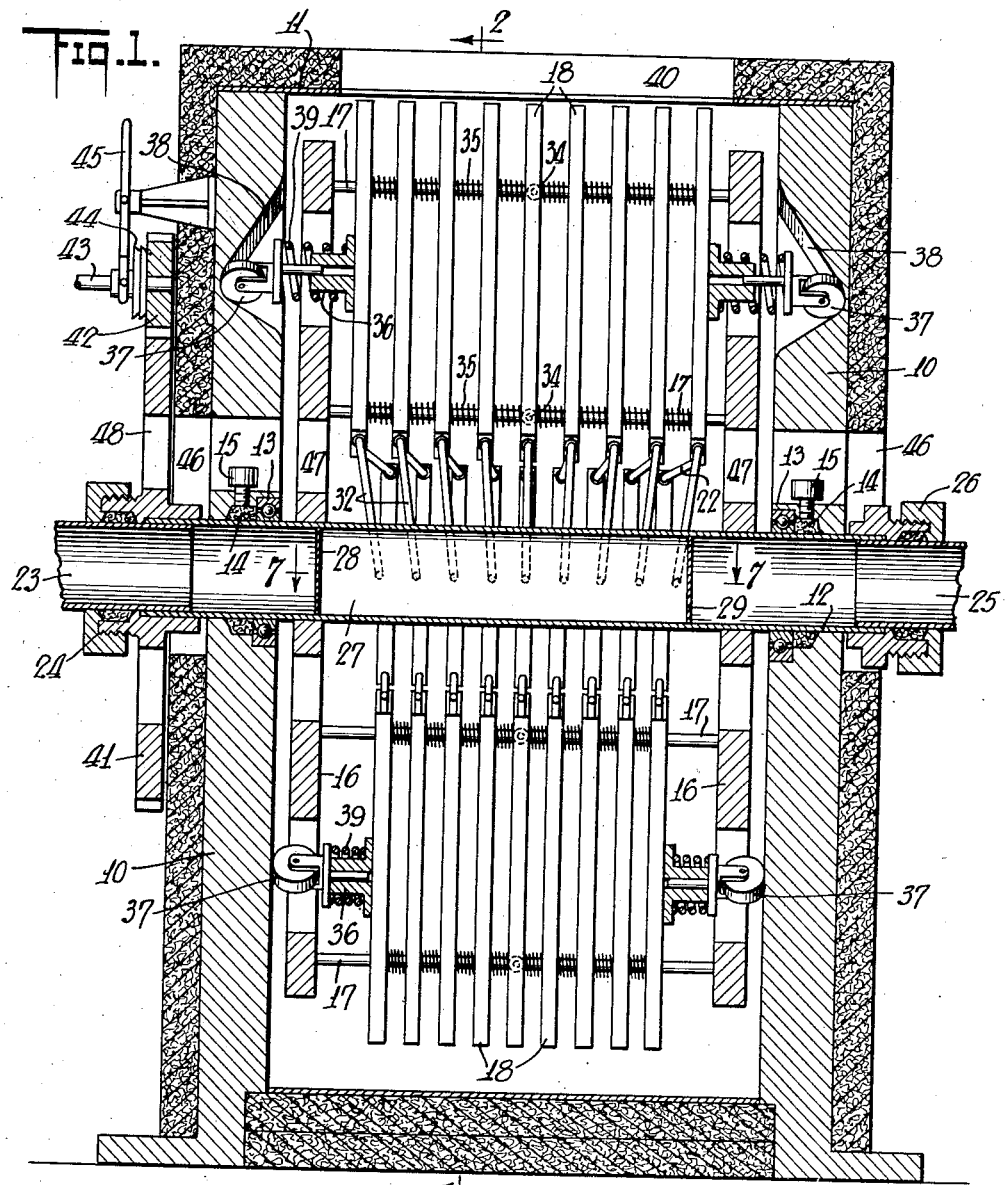
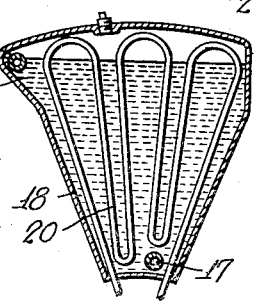
INVENTOR
*Clarence W. Vogt*
BY
ATTORNEYS Oct. 13, 1931.　　　　C. W. VOGT　　　　1,827,629
REFRIGERATING APPARATUS FOR PACKAGE GOODS
Filed Sept. 13, 1930　　　2 Sheets-Sheet 2
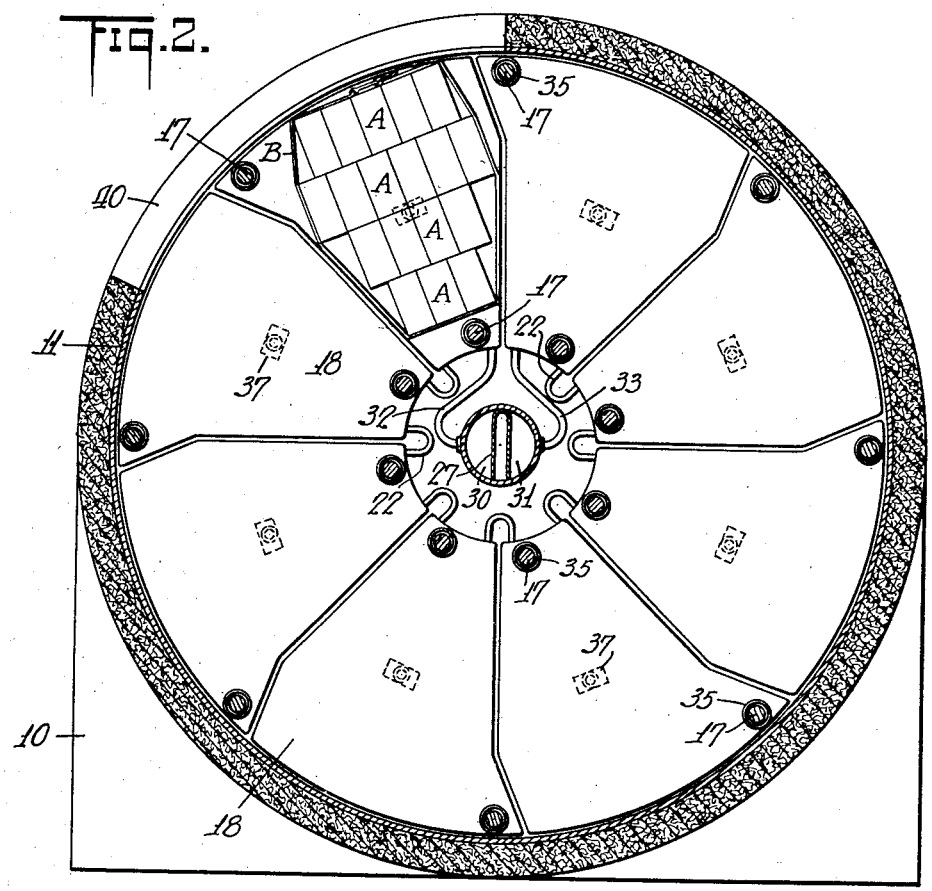
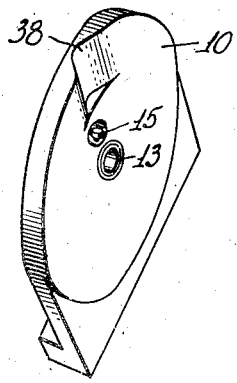
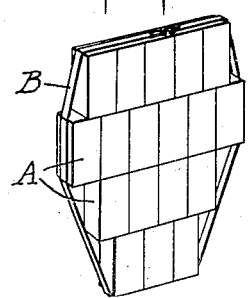
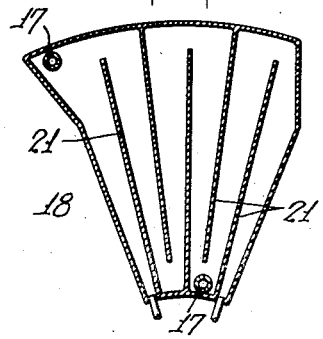
INVENTOR
Clarence W. Vogt
BY
ATTORNEYS Patented Oct. 13, 1931

1,827,629

UNITED STATES PATENT OFFICE

CLARENCE W. VOGT, OF LOUISVILLE, KENTUCKY, ASSIGNOR TO VOGT INSTANT FREEZERS INCORPORATED, OF LOUISVILLE, KENTUCKY, A CORPORATION OF DELAWARE

REFRIGERATING APPARATUS FOR PACKAGE GOODS

Application filed September 13, 1930. Serial No. 481,614.

This invention relates to an apparatus for refrigerating products, and particularly packages of comestibles. Merely as an example of the type of material which may be refrigerated in my improved apparatus I may mention fish, fruit and frozen confections and which are in suitably sized containers or packages.

It has heretofore been proposed to refrigerate or freeze such packages while conveying them between a pair of superposed endless belts to which the refrigerant is applied. Such apparatus must of necessity be very long to give adequate time for freezing or the rate of movement of the belts must be very slow. Such apparatus is also subject to various other objections which I have overcome by means of my invention.

The main object of my invention is to provide for the convenient loading and unloading of the maximum number of packages in an apparatus occupying the minimum space.

A further object is to reduce the number of attendants required as the loading and unloading are performed at the same point and may both be accomplished by a single attendant.

A further object is to increase the effectiveness of the refrigerant by holding the conveyors in firm engagement with the packages during the refrigerating part of the cycle and releasing them at the loading and unloading station.

A further object is to facilitate the work of the attendants by permitting the loading and unloading to be accomplished by an attendant outside of the refrigerated space.

A further object is to conserve the refrigerant and minimize the heat losses by providing a refrigerant space which is open only at the upper part for loading and unloading, whereby there is the minimum outflow of cold air due to convection currents.

A further object is to provide the conveyors for the packages, which present opposite effective surfaces, whereby a series of spaced conveyors may serve to form a series of refrigerating spaces alternating with the conveyors.

In the accompanying drawings I have illustrated merely one embodiment of my invention, although it will be apparent that various changes in the construction and arrangement of parts may be made within the spirit of my invention, as defined in the appended claims.

In these drawings:

Fig. 1 is a central vertical longitudinal section through an apparatus embodying my invention, Fig. 2 is a vertical transverse section on the line 2—2 of Fig. 1, Fig. 3 is a perspective view of one of the end walls on a very much smaller scale, Fig. 4 is a perspective view of a series of packages bound together for insertion in the apparatus, Figs. 5 and 6 are longitudinal sections through two forms of segments of the conveyor, and Fig. 7 is a detailed section on the line 7—7 of Fig. 1.

In my improved construction I provide two or more annular coaxially spaced refrigerated conveyors which are adapted to receive the packages therebetween. These conveyors are preferably movable toward and from each other so as to grip or release the packages and when in gripped pisition to provide efficient heat transfer between the packages and the refrigerant.

In the specific form illustrated there is provided a casing including end walls 10 and a peripheral wall 11. These walls are preferably provided with suitable insulation so as to prevent heat losses. The end walls serve to support a central hollow shaft 12 which is preferably disposed in a horizontal direction. The shaft is shown as mounted in ball bearings 13 and adjacent to each bearing is a packing 14 which may be kept saturated with lubricant delivered through oil cups 15.

The shaft carries a pair of annular rotatable end walls 16 which are rigidly connected by a series of tie rods 17 extending parallel to the axis of the shaft. Between the two end walls 16 and rotatable therewith are a series of annular refrigerant containers serving as conveyors for the packages and spaced apart to receive said packages therebetween. In the preferred form each conveyor is formed of a series of segmental sections 18, each of which is mounted to slide axially on a pair of the rods 17. The sections of each conveyor are thus held against any relative circumferential movement, but may have relative axial movement along said rods. Each of the conveyor sections is hollow for the circulation of a refrigerant therethrough.

In Fig. 6 I have shown a section in which there may be stored a fixed amount of liquid refrigerant 19, such as brine, and extending through the brine chamber is a coil 20 through which a refrigerant, such as ammonia, may be circulated. The ammonia may serve to partially freeze the brine so that the brine may act on the material to be frozen both through its low temperature and the latent heat of melting of the ice content therein. In this construction it is preferable that a slight air space be left, as shown in Fig. 6, to prevent distortion of the section during the freezing or thawing of the brine.

In Fig. 5 I have illustrated a form of section in which the interior is subdivided by baffles 21 to form a zigzag path for the refrigerant, such as brine, which may be circulated therethrough.

Preferably the several sections going to make up one annular conveyor are connected together in series by flexible pipes 22, whereby the refrigerant may flow through the several sections of a conveyor in succession.

For supplying refrigerant to the several conveyors the shaft 12 is preferably made hollow and serves as both a supply and delivery conduit. The refrigerant may be delivered through a non-rotatable inlet pipe 23 which is mounted in one of the end walls 10 and connected to the rotatable hollow shaft 20 by a suitable stuffing box 24. The refrigerant outlet pipe 25 may be mounted in the other end wall and similarly connected to the other end of the shaft 12, by a stuffing box 26.

The shaft 12 is shown as divided by a longitudinal partition 27 and this partition is connected to one side wall at one end and connected to the other side wall at the other end by transverse partitions 28 and 29 as shown in Fig. 7. Thus there are formed two parallel passages 30 and 31, one of which connects with one end of the hollow shaft and the other with the other end.

One of the sections of the endless conveyor is connected to the passage 30 by a flexible pipe 32 and the next adjacent one is connected to the passage 31 by a flexible pipe 33. Thus the refrigerant entering the pipe 23 may flow through the passage 31 and the pipe 33 to one section of the conveyor, thence through the other sections in series, and back through the pipe 32 and passage 30 to the discharge pipe 25. These pipes 32 and 33 are made flexible so as to permit relative axial movement of the sections in respect to the pipe and as the refrigerant on one side of the partition 27 is the cold incoming liquid and on the other side is the warmer outgoing liquid, the partition 27 is preferably made double to provide an insulating air space.

Means are provided for automatically moving the sections of adjacent conveyors apart when those sections approach the unloading stage and moving them back together again as they advance after being rotated at this same stage. Merely as an example of said automatic means I have shown the center conveyor rigidly secured on the rods 17 by suitable locking means 34 so as to prevent axial movement of this center conveyor. Between each pair of adjacent conveyors there are provided coil springs 35 on each of the rods 17 tending to push the conveyors axially away from each other and away from the center conveyor. Each section of the two outermost conveyors is provided with a bracket 36 carrying a roller 37 for engagement with a stationary cam.

As illustrated the end walls 10 have depressions 38 above the axis of the shaft and in the path of movement of the rollers so that as the shaft and conveyors rotate the rollers will travel along the surface of the end walls holding the conveyors compressed together against the action of the springs 35 until the rollers reach the cams 38. At this point the rollers may enter the depressions and the springs 35 will press the several conveyors apart.

In order to give a yielding pressure on the packages, each bracket 36 is formed of two telescoping sections pressed apart by a coil spring 39 of greater strength than the combined springs 35 so that when the rollers 37 are out of engagement with the cams 38 they will yieldingly press the several conveyors into firm engagement with the packages of material to be refrigerated and which have been placed between adjacent conveyors.

The casing is shown as provided with an opening 40 along the upper side thereof and of a width at least as great as the width of one of the sections 18. The packages to be refrigerated may be delivered through this opening into the space between adjacent conveyors and after they have been carried one or more times around the shaft they may be removed through the same opening.

The cam 38 is so positioned in respect to the opening 40 that the conveyors will release the packages as they reach the opening and will re-grip them as they leave the opening. If the shaft be intermittently rotated then the opening need be only of the width of the segment of the conveyor or the group of packages to be refrigerated. If the apparatus rotates continuously at a low rate of speed the opening should be a little wider so that as soon as the packages clear one side of the opening they may be removed and a new set of packages admitted before the segment reaches the far side of the opening. It will be evident that the shaft should rotate very slowly if thorough freezing is to be accomplished. Experience has indicated that a package two inches in thickness may be effectively and thoroughly frozen between 20 and 40 minutes depending upon the character of the material. Preferably the shaft makes one complete revolution in the time required for the complete freezing of the package.

Any suitable means may be provided for rotating the shaft. Merely as an example I have shown one end of the shaft provided with a gear 41 meshing with a pinion 42 on on a drive shaft 43. The pinion may be connected to or released from the shaft by a suitable clutch 44, the operating lever 45 of which may extend to a point adjacent the opening 40 so that the operator may stop the refrigerating conveyors at the proper position in respect to the opening if the machine be operated intermittently.

It will, of course, be understood that the opening 40 will normally be closed by an insulating cover to prevent heat losses.

The flexible connections 22, 32 and 33 permit the relative movement of the sections of the conveyor and means are provided whereby access may be gained to these connections in case of the need for adjustment or repair.

As shown the end walls 10 have openings 46 and the rotatable end walls 16 have openings 47 which may be aligned with the openings 46. Likewise the gear 41 may be of circular form or may have openings 48 which may be aligned with the openings 46 and 47. The oil cups 15 may be mounted in the openings 46 so that they may be readily adjusted. These openings outside of the oil cups are normally closed to prevent heat losses.

I do not wish to be limited to any particular type of package or package carrier which may be refrigerated in my improved apparatus. It is, of course, desirable that the packages all be of uniform thickness so that the conveyors will apply pressure to the outer walls of all of the packages. As previously noted the packages may be of about two inches in thickness, although if thinner the shaft and conveyors may be rotated at a more rapid rate.

Merely as an example of a convenient method of interchanging of packages, I have shown in Fig. 4 a plurality of packages A bound together by a strap B so as to hold them in the same plane. The packages may be connected together in this way and inserted as a single article and when refrigerated may be removed by using a portion of the strap B as a handle. The peripheral walls of each package may be of any suitable material, but the two opposite faces which contact with the refrigerated conveyors are preferably thin and may be of cellophane or other such material.

It will be noted that in my improved construction the casing is closed against the escape of the cold air therein except at the opening 40 which is near the top. Thus there will be the minimum outflow of cold air due to convection currents when the cover of the opening 40 is removed. Likewise if it is desired to maintain the packages in an inert or non-oxidized atmosphere during freezing the air in the casing may be displaced by carbon dioxide, nitrogen or the like and there will be comparatively little loss of this gas during the period when the opening 40 is uncovered.

It will be noted that in the construction illustrated all of the separate sections which are in axial alignment are separated at the same time because the cams 38 upon the opposite end walls are opposite to each other.

To facilitate the loading and unloading and reduce heat losses the cam 38 at one end may be staggered in respect to the cam on the other end so that the packages on one side of the center section will not be released until after the attendant has had time to remove those at the other side of the center section and replace them with fresh packages to be frozen.

The opening 40 may likewise be subdivided into two separate openings one at one side of the center conveyor and the other at the other side and properly positioned in respect to the position of the cams 38.

Having thus described my invention, what I claim as new and desire to secure by Letters Patent is:

1. An apparatus for freezing packaged goods, including a pair of annular coaxially spaced relatively movable refrigerated conveyors adapted to receive the packages therebetween.

2. An apparatus for freezing packaged goods, including a pair of annular coaxially spaced refrigerated conveyors adapted to receive the packages therebetween and relatively movable axially to hold or release the packages disposed therebetween.

3. An apparatus for freezing packaged goods, including a pair of annular coaxially spaced refrigerated conveyors adapted to receive the packages therebetween, and means for yieldingly pressing one of said conveyors toward the other.

4. An apparatus for freezing packaged goods, including a pair of annular coaxially spaced refrigerated conveyors adapted to receive the packages therebetween, and yielding means normally tending to separate said conveyors.

5. An apparatus for freezing packaged goods, including a pair of annular coaxially spaced refrigerated conveyors adapted to receive the packages therebetween, means acting to separate said conveyors at one point in the path of rotation, and means acting to press said conveyors together at another point.

6. An apparatus for freezing packaged goods, including a pair of annular coaxially spaced refrigerated conveyors adapted to receive the packages therebetween, and means for effecting relatively axial movement of the conveyors at one part of the path of annular movement.

7. An apparatus for freezing packaged goods, including a pair of annular coaxially spaced refrigerated conveyors adapted to receive the packages therebetween, a spring tending to press said conveyors apart axially, a spring tending to press said conveyors together, and means for varying the effective pressure of one of said springs in respect to the other.

8. An apparatus for freezing packaged goods, including a pair of movable coaxially spaced refrigerated conveyors adapted to receive the packages therebetween, each of said conveyors being formed of separate sections relatively movable axially.

9. An apparatus for freezing packaged goods, including a pair of movable spaced refrigerated conveyors adapted to receive the packages therebetween, each of said conveyors being formed of separate sections relatively movable in a direction at an angle to the path of movement of said conveyors to engage or disengage the packages, and means for separating each successive pair of opposed sections at one part of the path of movement.

10. An apparatus for freezing packaged goods, including a pair of movable spaced refrigerated conveyors adapted to receive the packages therebetween, each of said conveyors being formed of separate sections relatively movable in a direction at an angle to the path of movement of said conveyors to engage or disengage the packages, and a stationary cam for effecting said relative movement.

11. An apparatus for freezing packaged goods, including a pair of movable hollow spaced refrigerated conveyors adapted to receive the packages therebetween, and means for circulating a refrigerant through said conveyors in parallelism.

12. An apparatus for freezing packaged goods, including a pair of spaced refrigerated conveyors adapted to receive the packages therebetween, each of said conveyors being formed of separate sections relatively movable in a direction at an angle to the path of movement of said conveyors to engage or disengage the packages, and means for circulating refrigerant through the several sections of each conveyor.

13. An apparatus for freezing packaged goods, including a pair of annular coaxially spaced refrigerated conveyors adapted to receive the packages therebetween, a central shaft, and means for permitting relative axial movement of said conveyors in respect to said shaft and preventing relative rotational movement.

14. An apparatus for freezing packaged goods, including a pair of annular coaxial conveyors presenting spaced walls adapted to receive the packages therebetween, a hollow rotatable shaft coaxial with said conveyors, and means for delivering refrigerant to refrigerate the outer surfaces of said walls.

15. An apparatus for freezing packaged goods, including a pair of spaced refrigerated conveyors movable along substantially parallel paths and adapted to receive the packages therebetween, each of said conveyors being formed of separate sections relatively movable axially, flexible connections between the sections of each conveyor, and means for circulating a refrigerant through said sections in series.

16. An apparatus for freezing packaged goods, including a shaft, a pair of annular coaxial sectional conveyors carried thereby, connections between said shaft and said conveyors for the circulation of refrigerant through the latter, and means for effecting relative axial movement of the separate sections of said conveyors to grip or release packages disposed between adjacent conveyors.

17. An apparatus for freezing packaged goods, including a shaft, a pair of annular coaxial sectional conveyors carried thereby, connections between said shaft and said conveyors for the circulation of refrigerant through the latter, and a casing enclosing said conveyors and supporting said shaft and having cams for effecting axial movement of each section of each conveyor at one point in the path of movement of the latter.

18. An apparatus for freezing packaged goods, including a casing having a horizontal shaft, a series of annular conveyors carried thereby and spaced apart axially, one of said conveyors being fixed against axial movement in respect to the shaft and the other conveyors upon opposite sides of said first mentioned conveyor being relatively movable toward and from said first mentioned conveyor.

19. An apparatus for freezing packaged goods, including a casing having opposed end walls, a horizontal shaft disposed within said casing and having a series of annular axially spaced conveyors connected thereto, means upon said shaft for effecting axial separation of said conveyors, and said casing having an opening at the upper portion thereof for permitting the insertion and removal of said packages between said conveyors when they are axially separated.

20. An apparatus for freezing packaged goods, including a shaft, a pair of annular coaxial conveyors carried thereby and spaced apart axially to receive the packaged goods therebetween, said conveyors and said shaft having passages for the circulation of refrigerant therethrough, and separate connections between said shaft and each of said conveyors for delivering the refrigerant to and from the latter.

Signed at New York in the county of New York and State of New York this 6th day of September, A. D. 1930.

CLARENCE W. VOGT.